United States Patent
Minadakis

(10) Patent No.: US 7,661,093 B2
(45) Date of Patent: Feb. 9, 2010

(54) METHOD AND SYSTEM FOR ASSESSING PERFORMANCE OF A VIDEO INTERFACE USING RANDOMIZED PARAMETERS

(75) Inventor: Yannis Minadakis, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 885 days.

(21) Appl. No.: 11/046,474

(22) Filed: Jan. 28, 2005

(65) Prior Publication Data

US 2006/0174233 A1 Aug. 3, 2006

(51) Int. Cl.
G06F 9/44 (2006.01)

(52) U.S. Cl. .................. 717/124; 714/38; 717/107; 717/131; 717/140

(58) Field of Classification Search .......... 345/418; 714/38; 717/124, 127, 131; 719/323
See application file for complete search history.

(56) References Cited

U.S. PATENT DOCUMENTS

| | | | |
|---|---|---|---|
| 5,642,171 A | 6/1997 | Baumgartner et al. | |
| 6,321,293 B1 | 11/2001 | Fabrizio et al. | |
| 6,609,201 B1 * | 8/2003 | Folmsbee | 713/187 |
| 6,631,423 B1 * | 10/2003 | Brown et al. | 719/323 |
| 7,363,614 B2 * | 4/2008 | Kageyama et al. | 717/124 |
| 2004/0003278 A1 * | 1/2004 | Chen et al. | 713/200 |
| 2004/0025083 A1 * | 2/2004 | Nanja et al. | 714/35 |
| 2005/0008254 A1 | 1/2005 | Ouchi et al. | |

OTHER PUBLICATIONS

Dhagat, "3DMark03 Next Generation 3d Benchmarking", Feb. 2003, Futuremark Corporation white paper.*
Tomov et al., "Benchmarking and Implementation of Probability-Based Simulations on Programmable Graphics Cards", Dec. 2003, arXiv.org.*
Rost, "OpenGL Shading Language", Feb. 2004, Addison Wesley Professional, Section 3.8, Chap 7, Sections 7.1-7.3, 7.7, 7.8, Chap 12, pp. 1-7.*
Thomas Pabst; 3D Benchmarking—Understanding Frame Rate Scores; http://www1.graphics.tomshardware.com/graphic/20000704/index.html; Jul. 4, 2000; 24 pp.; TG Publishing AG 1996-2005.

* cited by examiner

Primary Examiner—Lewis A Bullock, Jr.
Assistant Examiner—Jue S Wang
(74) Attorney, Agent, or Firm—Marshall, Gerstein & Borun LLP

(57) ABSTRACT

A method for assessing relative performance of a video interface is disclosed. In the disclosed method, code to be compiled and executed by the video interface includes a plurality of parameters. The parameters are randomized such that a large number of permutations exist for the compiled code. After the compiled code is randomized and compiled it is executed and statistical properties of the video interface, such as frames per second displayed, are determined.

20 Claims, 4 Drawing Sheets

METHOD AND SYSTEM FOR ASSESSING PERFORMANCE OF A VIDEO INTERFACE USING RANDOMIZED PARAMETERS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention generally relates to computer systems. More particularly, this invention relates to a method for assessing performance of a video interface.

BACKGROUND OF THE INVENTION

Many application programs provide video output, e.g. display of images on a computer monitor, during execution. Such video output is controlled, in part, by a software module called a display driver and hardware component which connects to the monitor called a video card. The display driver receives requests from the application program and translates the requests into instructions that are understood by the video card. The video card executes the instructions, which process results in desired images being rendered and displayed on the monitor.

A frame is static display of images on the monitor at a particular time. Animation, i.e. moving images, is achieved by rendering and displaying successive frames. Some application programs, such as certain games, rely heavily upon animation during execution. The performance of these applications programs on a computer system depends, in part, upon how well that system is able to display the desired animations while the application executes. This depends in large part on the quality of the video interface.

Video interfaces are rated using certain metrics. One example of a metric is a measured frames per second (FPS). The measured FPS value is obtained by executing a portion of an application that uses video output to determine how many frames are displayed over time. The number of frames displayed is dived by the time to arrive at the FPS value. Once measured, the FPS value is supposed to provide a comparative measure of the performance that will be achieved using a particular video interface. The larger the FPS value, the better the video interface is supposed to perform.

The measured FPS, however, does not always accurately reflect the relative performance of the video interface. One reason is that the benchmarks used to test and determine FPS for video interfaces may be known in advance by the video interface manufacturer. The manufacturer may optimize the driver used with the video card to perform well when tested with the benchmark. However, such optimizations do not necessarily mean that the driver will perform equally well when executing code other than the benchmark. In fact, the selected optimizations made by the video interface manufacturer may make the video interface unstable and degrade overall performance of the interface.

SUMMARY OF THE INVENTION

The invention is directed to a method and system for assessing the relative performance of a video interface, which includes a display driver and a video card. The invention uses a combinatorial shader module. The combinatorial shader module further includes a randomizer, which randomizes parameters in one or more shader programs. After the parameters are randomized, the program is compiled and executed and the combinatorial shader collects statistics such as the number of frames per second rendered and displayed by the video interface. The compiled shader program has a large number of potentially different resulting code because of the randomization. However, the resulting code has substantially the same performance characteristics regardless of how the shader program is randomized.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
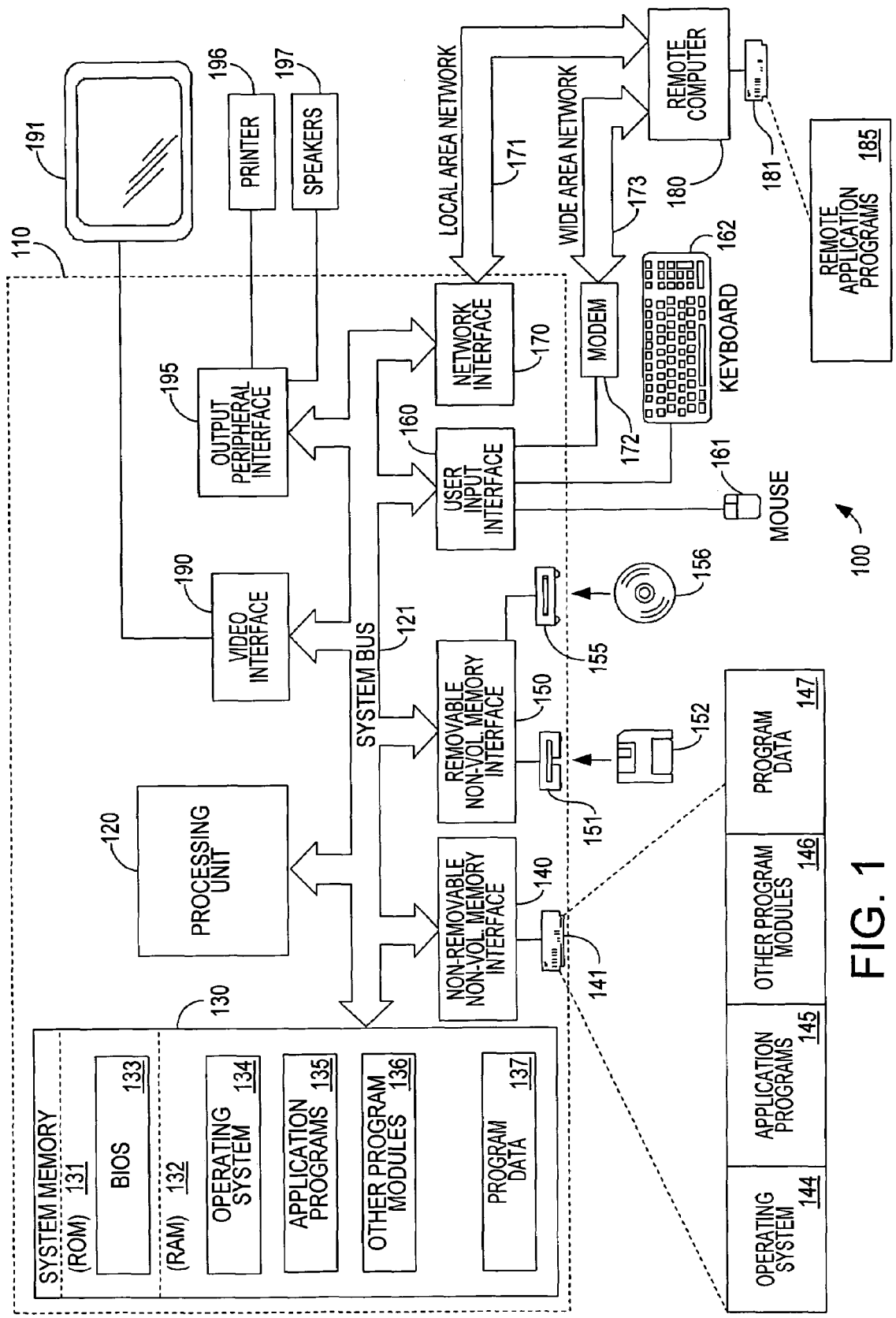
FIG. 1 is a block diagram generally illustrating an exemplary computer system that may be used to carry out the methods of the present invention.

A method and system for assessing the relative performance of a video interface will now be described with respect to certain embodiments. The method and system create randomized code and collect statistics concerning performance of the video interface while executing the randomized code.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that performs particular tasks or implement particular abstract data types. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
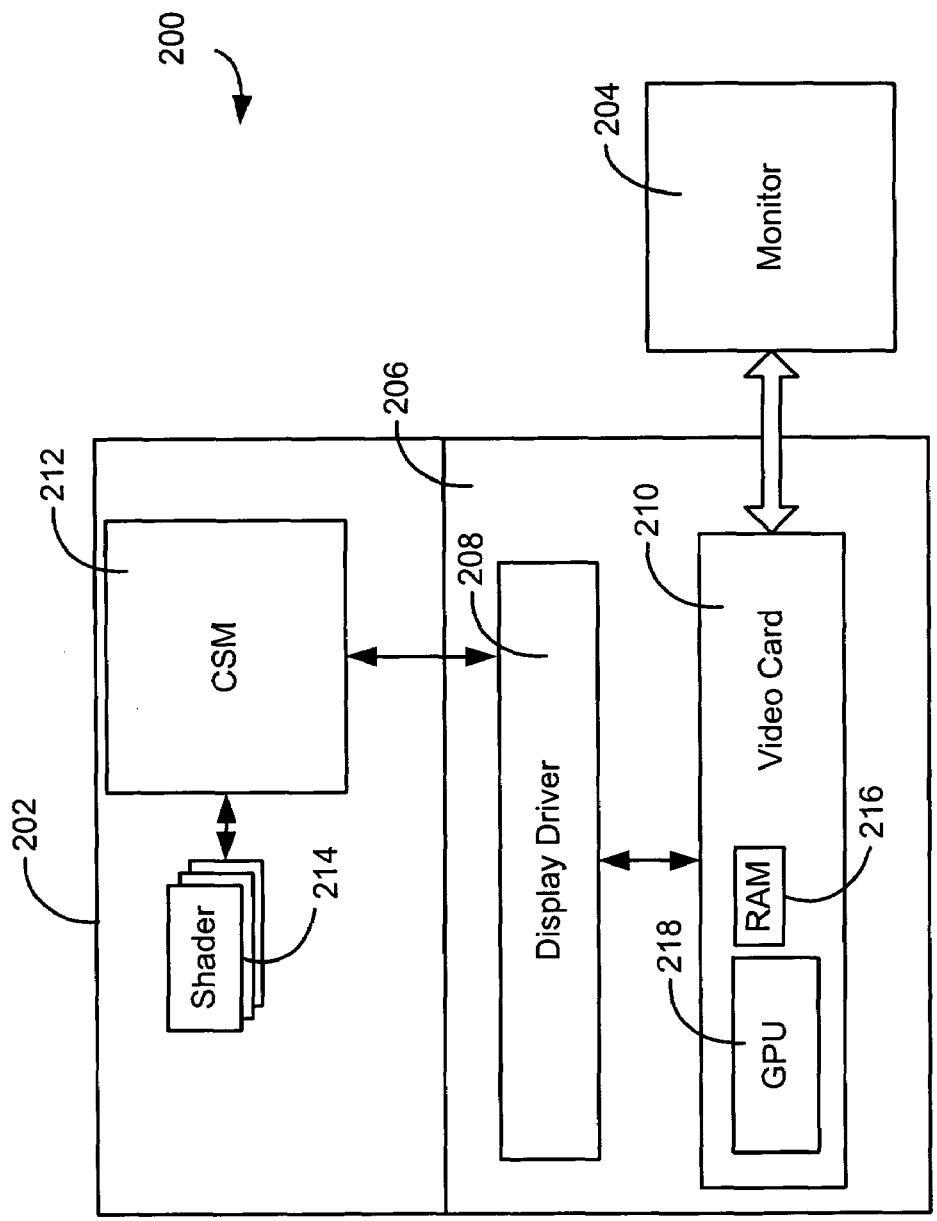
FIG. 2 is a block diagram generally illustrating an exemplary operating environment wherein the present invention may be employed.

FIG. 2 illustrates a block diagram of an exemplary operating environment 200 wherein the method and system of the present invention may be employed. The invention includes a combinatorial shader module that measures statistics, such as the frames per second rendered and displayed by a video interface, when one or more shader programs are executed. Parameters in the shader programs are randomized by the combinatorial shader such the resulting code varies when the shader program is compiled.

The operating environment 200 includes a computer 202 and a monitor 204. The monitor 204 is any suitable device for displaying images. The monitor 204 may be a separate device or alternatively integral with the computer 202.

The computer 202 is any device capable of being used to execute an application that displays images on the monitor 204. By way of example and not limitation, suitable devices include the computer 110 described with reference to FIG. 1. Other examples of a suitable computer 202 include a dedicated gaming system or a personal digital assistant.

The computer 202 includes a video interface 206. As used herein, the term video interface refers to the combination of a display driver 208 and a video card 210. The video card 210 provides for physical connection to the monitor 204 and includes components such as memory 216 and a graphics processing unit (GPU) 218. The display driver 208 is a software module that receives device independent requests from an application program and translates the requests into device specific instructions. The device specific instructions are used by the video card 210 to render and display the frames on the monitor 204.

In accordance with the invention, a combinatorial shader module (CSM) 212 executes and determines the relative performance of the video interface 206. To determine the relative performance of the video interface 206, the CSM 214 uses one or more shader programs 214. The CSM loads the one or more shader programs 214 and randomizes parameters included therein. The CSM further causes the shader programs having the randomized parameters to be compiled and executed by the video interface 206. During execution of the shader program, the CSM collects statistics concerning the performance of the video interface 206.

Shader programs provide a way of causing desired images and animation to be displayed. The shader program includes data and code and may be written in a low level language that resembles assembly language or a higher level language that resembles the C programming language. A specific example of a high level language is the High Level Shader Language (HLSL). Shader programming languages are known and, accordingly, are not described in detail herein. However, were appropriate, features of shader programming are summarized and examples of shader programs are provided to aid in understanding the present invention.

Figure 3:
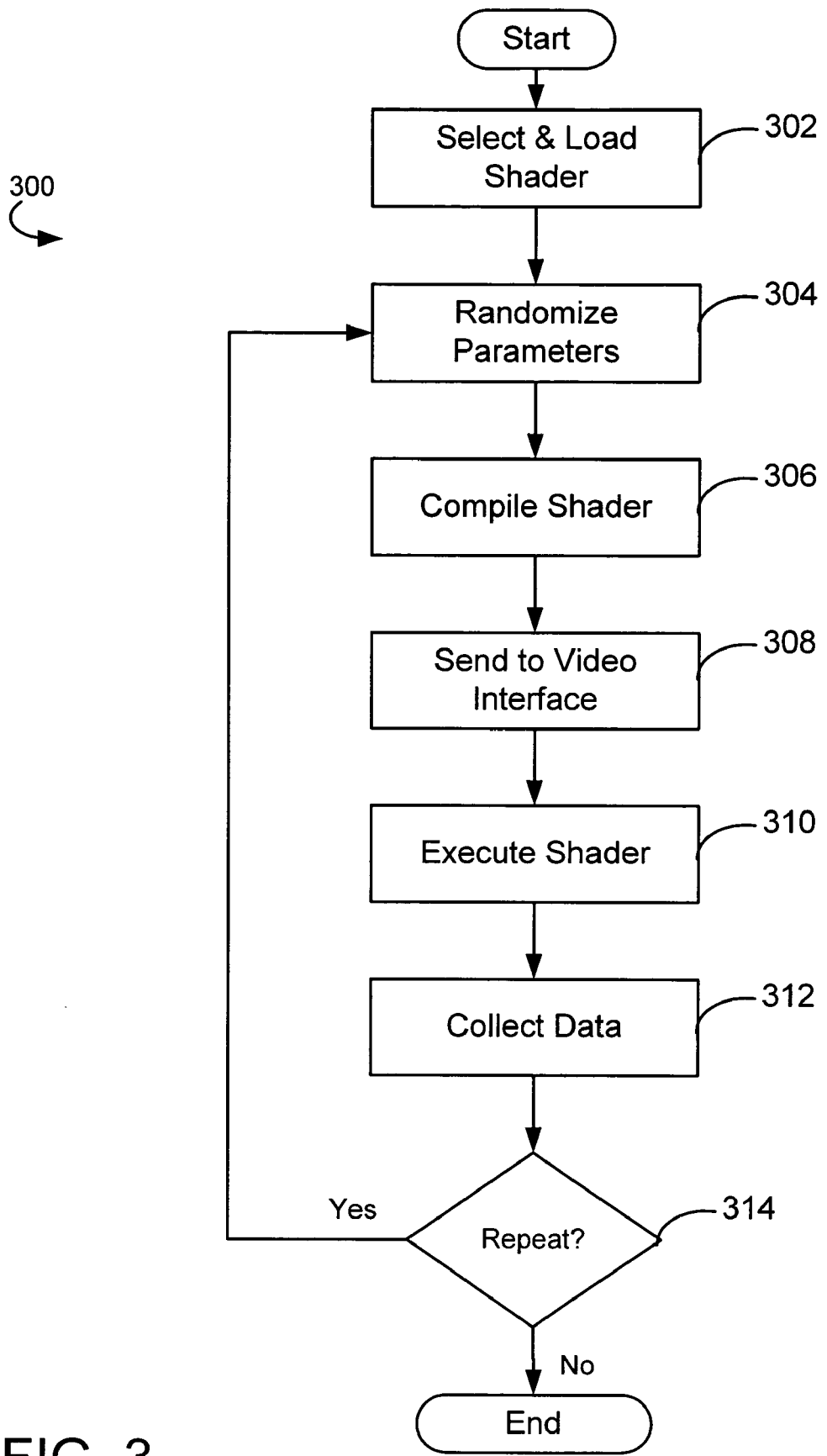
FIG. 3 is a flow chart generally illustrating a method for assessing relative performance of a video interface according to the present invention.

FIG. 3 illustrates an example of the method used by the CSM 212 to evaluate the performance of the video interface 206. As shown in step 302 a shader program is selected from the plurality of shader programs 214 and loaded. In step 304, the CSM 212 randomizes one or more parameters in the shader program and then causes the shader program to be compiled in step 306. The shader program is designed such that the resulting code after the program is compiled has substantially the same length and complexity regardless of the random values that are assigned to the parameters. Specific examples of such shader programs are set forth below.

In step 308 the compiled code is sent to the video interface 206, which converts the code into a form that is understood by the video card 210. The video card executes the code which causes one or more frames to be displayed on the monitor 204.

As shown in step 312, statistics are collected concerning the performance of the video interface 206 while the shader program executes. By way of example and not limitation such, statistics include the number of frames per second that are rendered and displayed by the video interface 206 and the amount of CPU resources that are consumed by the video interface 206 and that remain available while the shader program executes.

In step 314, the CSM 212 decides whether the repeat execution of the shader program. For example, it may be desirable to execute the shader program multiple times to obtain further data to be used when collecting statistics such as the frames per second. If the shader program is to be run additional times, the shader code is again randomized in step 304 and the remaining steps are repeated until the shader program is randomized and executed by the video card the desired number of times.

In an embodiment of the invention, the method 300 can be used with different types of shader programs and each type may test different features of the video interface. For example, one type of shader program may test basic features of the video interface 206, such as the ability to read from memory and the like. Another type of shader program may test how quickly the video interface is able to render and display images. Yet another type of shader program may test the ability of the video interface 206 to perform arithmetic operations. If different types of shader programs are employed, the method 300 is performed the desired number of iterations with each type of shader program.

After the process 300 is complete, the statistics are reported in any suitable manner. For example the statistics are displayed on the monitor or stored and saved in a log file.

Figure 4:
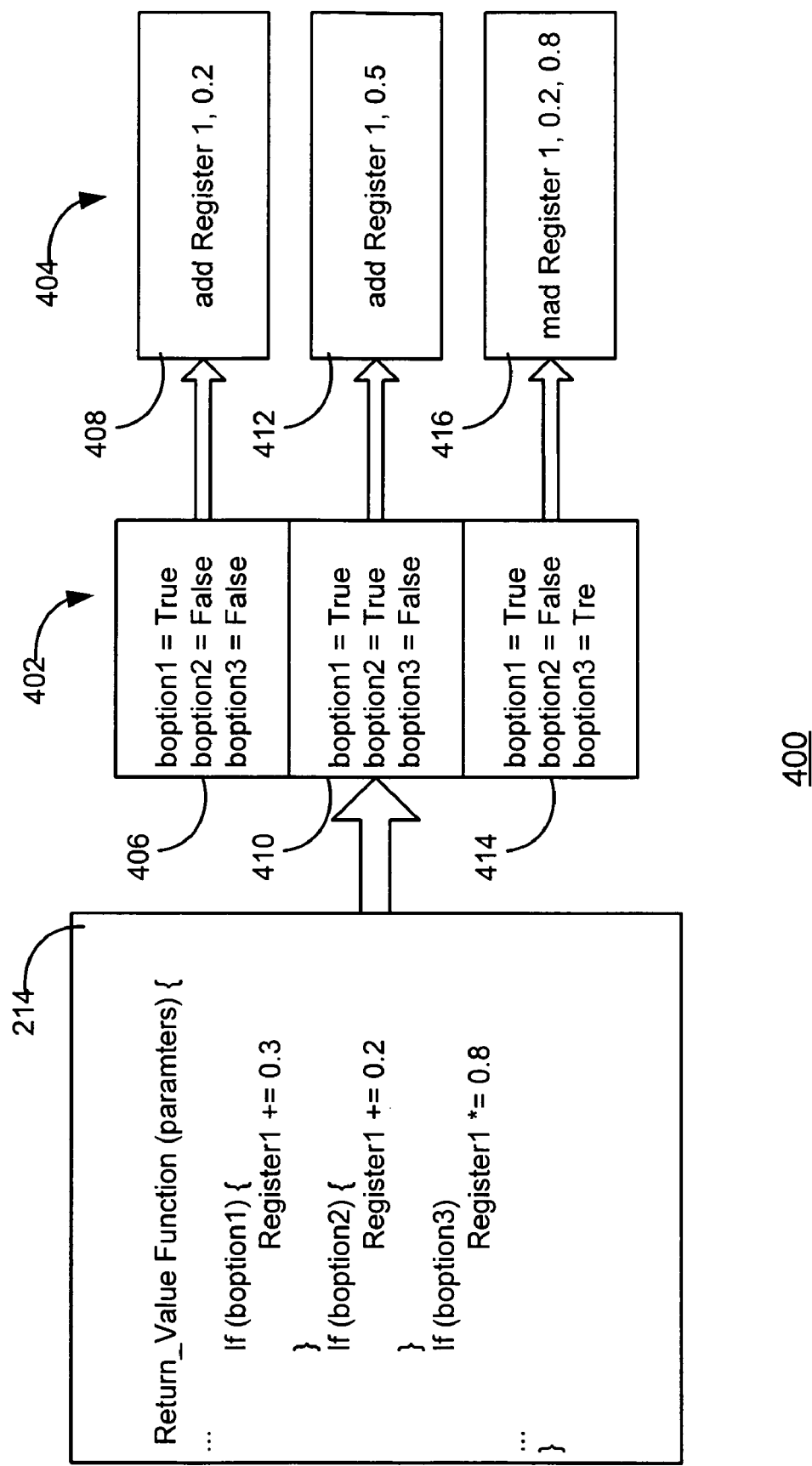
FIG. 4 is a block diagram generally illustrating a method of creating a randomized shader program according to the present invention.

FIG. 4 illustrates an example of a portion shader program 214 and the randomization function that is provided by the CSM 212 in accordance with the invention. It will be understand that the following description is only provided to illustrate the randomization function and is not intended to limit the scope of the present invention.

The shader program 214 includes a series of instructions, which depend upon the value of certain parameters. In the example shown, the instructions are "if" statements with parameters that are Booleans variables "boption1," "boption2," and "boption3." The Boolean variables are compiler variables which are defined prior to compiling the shader program 214. If the Boolean variable is set to true, a corresponding action, e.g. add or multiply, will be carried out. Conversely if the Boolean variable is set to false, the action is not carried out.

As a more specific example, the results of three permutations of randomized parameters are generally shown at 402 with the corresponding resulting compiled code shown at 404. In a first permutation 406, the CSM 212 sets boption1 to true and boption2 and boption3 to false. This permutation results in the "if" statements associated with boption2 and boption3 being ignored. Only the instruction associated with boption1 needs to be considered. The corresponding resulting code 408 is: add Register1, 0.2.

In a second permutation 410, the CSM 212 sets boption1 and boption2 to true and boption3 to false. In the second permutation, the compiler does not need to generate two separate instruction in corresponding resulting code 412. Rather the resulting code 220 includes the following single instruction: add, Register1, 0.5.

In a third permutation 414, the CSM 212 sets boption1 and boption3 to true and boption2 to false. Again, the compiler does not need to generate two separate instructions in the corresponding resulting code 414. Rather, the resulting code is a single instruction to multiply and add values, namely: mad, 0.3, 0.8.

As illustrated by the above examples, the resulting code varies depending upon how the various parameters are set prior to compiling the code. Importantly, however, the complexity of the resulting code remains substantially the same because it includes a single arithmetic operation.

By selecting an appropriate number of variables, the number of permutations that make up the resulting code can be sufficiently large such that it is not practical to optimize the video interface 206 to execute the shader programs 214. Accordingly, the statistics collected by the CSM 212 accurately reflect performance of the video interface 206.

In the description that follows, specific examples of shader programs found to be suitable for randomization according to the present invention are provided. It is to be understood that the examples are provided for illustrative purposes and not by way of limitation.

Each example shader program includes two main components, namely, a vertex shader component and pixel shader component. Vertex shaders and pixel shaders are known and need not be described in detail. Briefly, however, it is noted that images are made up of a series of polygons and texture. Each polygon is defined by a set of vertices. The texture is an image or set of images displayed within the polygon. The vertex shader is used to convert data that defines the vertices to screen coordinates, i.e. the coordinates that identify which pixels on the monitor make up the vertices. The pixel shader is used to determine a value for each pixel within the polygon based upon texture data.

Example 1, below, is the code for a basic shader. The basic shader is designed to test basic functionality of the video interface, such the ability to read data from memory. Because such basic functionality is tested, the variables in this basic shader need not be randomized.

EXAMPLE 1

```
//========================================================
/*! \file BaseShaders.fx
    Copyright (c) 2003 Microsoft Corporation
*/
// transform matrix
float4x4 WorldViewProjectionMatrix : register (c0);
// camera location
float4 EyePoint : register (c4);
//---------------------------------------------------------
/*! This shader takes the input color from the vertex
    shader and adds a fixed alpha.
*/
float4 SimplePixelShader( in float4 Lighting : COLOR0 ) : COLOR
{
    float4 fColor;
    fColor.rgb = Lighting;
    //add an alpha if in case it is enabled
    fColor.a = .3;
    return fColor;
}
//---------------------------------------------------------
/*! This vertex shader transforms the vertex into clip space and does
    per-vertex lighting.
*/
void SimpleVertexShader(
        float4 InPosition : POSITION,
        float4 InNormal : NORMAL,
        out float4 OutPosition : POSITION,
        out float4 Lighting : COLOR0
        )
{
    // compute screen position of vertex
    OutPosition = mul(InPosition, WorldViewProjectionMatrix);
    // ambient term in the lighting equation
    const float1 Ambient = .1;
    // compute some simple lighting for the sphere
    Lighting = dot(InNormal, normalize(EyePoint-InPosition)) + Ambient;
}
texture Texture1 : TEXTURE0;
// setup samplers for each texture stage
sampler Sampler1 = sampler_state
{
    Texture = <Texture1>;
};
//---------------------------------------------------------
/*!
*/
float4 RTPixelShader( in float2 TexCoord : TEXCOORD0 ) : COLOR
{
    float4 fColor;
    fColor.rgb = tex2D( Sampler1, TexCoord ).rgb ;
    //add an alpha if in case it is enabled
    fColor.a = 1;
    return fColor;
}
//---------------------------------------------------------
```

-continued

```
/*!
*/
float4 fLinearScale : register( c0 );
float4 RTFloat16PixelShader( in float2 TexCoord : TEXCOORD0 ) :
COLOR
{
  float4 fColor;
  fColor.rgb = tex2D( Sampler1, TexCoord ).rgb ;
  fColor *= fLinearScale;
  //add an alpha in case it is enabled
  fColor.a = 1;
  return fColor;
}
//---------------------------------------------------------------------
// END OF : BaseShaders.fx
//+=====================================================
```

Example 2, below, is the code for a texture shader designed to test video capabilities of the video interface. The video capabilities include the ability of the video interface to display and render images on the monitor.

EXAMPLE 2

```
//=====================================================
/*! \file TextureShaders.fx
    Copyright (c) 2003 Microsoft Corporation
*/
//
// Booleans to generate different shaders at runtime.
//
bool VSOpt0 : VSOPT0 = 0;
bool VSOpt1 : VSOPT1 = 0;
bool VSOpt2 : VSOPT2 = 0;
bool VSOpt3 : VSOPT3 = 0;
bool VSOpt4 : VSOPT4 = 0;
bool VSOpt5 : VSOPT5 = 0;
bool VSOpt6 : VSOPT6 = 0;
bool VSOpt7 : VSOPT7 = 0;
bool VSOpt8 : VSOPT8 = 0;
bool VSOpt9 : VSOPT9 = 0;
bool PSOpt0 : PSOPT0 = 0;
bool PSOpt1 : PSOPT1 = 0;
bool PSOpt2 : PSOPT2 = 0;
bool PSOpt3 : PSOPT3 = 0;
bool PSOpt4 : PSOPT4 = 0;
bool PSOpt5 : PSOPT5 = 0;
bool PSOpt6 : PSOPT6 = 0;
bool PSOpt7 : PSOPT7 = 0;
bool PSOpt8 : PSOPT8 = 0;
bool PSOpt9 : PSOPT9 = 0;
// Vertex constants array
#define VERTEX_CONSTANT_ARRAY_SIZE 15
float4 VertexConstantArray[ VERTEX_CONSTANT_ARRAY_SIZE ] : register
(c5);
float4x4 WorldViewProjectionMatrix : register (c0);
float4 EyePoint : register (c4);
// Debug: Setting constant statically, not programmatically. Used to view
// assembly instructions using fxc.exe.
//
// NUMBER_TEXTURE_COORDINATES is set during runtime
// based on the number of texture coordinates in the sphere currently
// being rendered
// #define NUMBER_TEXTURE_COORDINATES 16
#if (NUMBER_TEXTURE_COORDINATES > 8)
#define NUMBER_TEXTURE_REGISTERS 8
#else
#define NUMBER_TEXTURE_REGISTERS
NUMBER_TEXTURE_COORDINATES
#endif
//-----------------------------------------------------------------------------
/*! This function is used to generate many perturbations of vertex
    shaders. By changing the Boolean flags, unique
    shaders are created with similar running time.
    \param fPos is the screen position.
    \param fTex is the last texture coordinate.
*/
float4 PurturbVertexConstants( float4 fPos, float2 fTex )
{
    float4 fBlend = 1.0;
    float4 fMod = float4( 0.51, .998, .6584, 0.0 );
    if( VSOpt0 ) {
       fMod -= .3;
    }
    if( VSOpt1 ) {
```

-continued

```
      fMod += 1.2;
   }
   if( VSOpt2 ) {
      fMod /= .854;
   }
   if( VSOpt3 ) {
      fMod.x += 0.6;
   }
   if( VSOpt4 ) {
      fMod.y -= .45;
   }
   if( VSOpt5 ) {
      fMod.z *= 1.5;
   }
   if( VSOpt6 ) {
      fMod *= 1.5;
   }
   fMod.a = 0.0; // do not affect alpha
   float4 vc0, vc1, vc2;
   for(int j=2; j < VERTEX_CONSTANT_ARRAY_SIZE-2; j += 1 ) {
      vc0 = VertexConstantArray[ j ];
      vc1 = VertexConstantArray[ j - 1 ];
      // Note that with compilation, only the last assignment is outputted
      if( VSOpt7 ) {
         vc1 = VertexConstantArray[ j + 1 ];
      }
      if( VSOpt8 ) {
         vc1 = VertexConstantArray[ j + 2 ];
      }
      if( VSOpt9 ) {
         vc1 = VertexConstantArray[ j - 2 ];
      }
      fBlend *= vc0 + vc1;
   }
   fBlend = 1.5 * normalize( fBlend * fMod * fPos * float4( fTex, fTex ) );
   return fBlend;
}
//------------------------------------------------------------------------------
//! HLSL vertex shader for vs_2_0. The purpose of the shader is to transform
// the incoming vertices, assign the position and texture coordinates to the
// output registers. It computes a simple point light source with no shadowing.
// It weighs the lighting by a random computation inserted to consume
// computational time. It influences the lighting so that its result will be
// visible on the rendered frame
/*!
   \param InTextureCoordinates is the input array of texture coordinates to the
      vertex shader. The length is based on the
NUMBER_TEXTURE_COORDINATES
      macro, and the parameter is not defined when there are no texture
      coordinates on the vertex
   \param OutTextureCoordinates is an array of texture coordinates output by the
      vertex shader. The length is based on the
NUMBER_TEXTURE_COORDINATES
      macro, and the parameter is not defined when there are no texture
      coordinates on the vertex
   \param InPosition is the x,y,z position of the vertex in world coordinates
   \param OutPosition is the x,y pixel location of vertex in screen coordinates
   \param Lighting is the computed light value at that vertex
   \return void
   \note NUMBER_TEXTURE_COORDINATES must be set at runtime for the shader
to compile. If the vertex constants are no set, it will still run, but it will compute its
result with garbage constants.
*/
void TextureVertexShader(
   #if (NUMBER_TEXTURE_REGISTERS > 0)
      float2 InTextureCoordinates[ NUMBER_TEXTURE_REGISTERS ] :
TEXCOORD0,
      out float2 OutTextureCoordinates[ NUMBER_TEXTURE_REGISTERS ] :
TEXCOORD0,
   #endif
      float4 InPosition : POSITION,
      float4 InNormal : NORMAL,
      out float4 OutPosition : POSITION,
      out float4 Lighting : COLOR0
      )
{
   // compute screen position of vertex
   OutPosition = mul( InPosition, WorldViewProjectionMatrix );
   // transformed light position
```

```
  float4 LightPos = EyePoint;
  // ambient term in the lighting equation
  const float1 Ambient = .15;
  // compute some simple lighting for the sphere
  Lighting = dot( InNormal, normalize( LightPos-InPosition ) ) + Ambient;
  // if we have texture coordinates, copy them to the output registers
  #if (NUMBER_TEXTURE_COORDINATES > 0)
  for( int i = 0; i < NUMBER_TEXTURE_REGISTERS; ++i) {
     OutTextureCoordinates[ i ] = InTextureCoordinates[ i ];
  }
  float4 Accumulator = PurturbVertexConstants(
          float4( OutPosition.xy, OutPosition.yx ),
          InTextureCoordinates[ NUMBER_TEXTURE_REGISTERS - 1 ] );
  #else
  float4 Accumulator = PurturbVertexConstants(
          float4( OutPosition.xy, OutPosition.yx ),
          float2( InNormal.y, InNormal.z ) );
  #endif
  Lighting = lerp( Lighting, Accumulator, .35 );
}
// Texture stages we may use
texture Texture1 : TEXTURE0;
texture Texture2 : TEXTURE1;
texture Texture3 : TEXTURE2;
texture Texture4 : TEXTURE3;
texture Texture5 : TEXTURE4;
texture Texture6 : TEXTURE5;
texture Texture7 : TEXTURE6;
texture Texture8 : TEXTURE7;
// setup samplers for each texture stage
sampler Sampler1 = sampler_state
{
  Texture = <Texture1>;
};
sampler Sampler2 = sampler_state
{
  Texture = <Texture2>;
};
sampler Sampler3 = sampler_state
{
  Texture = <Texture3>;
};
sampler Sampler4 = sampler_state
{
  Texture = <Texture4>;
};
sampler Sampler5 = sampler_state
{
  Texture = <Texture5>;
};
sampler Sampler6 = sampler_state
{
  Texture = <Texture6>;
};
sampler Sampler7 = sampler_state
{
  Texture = <Texture7>;
};
sampler Sampler8 = sampler_state
{
  Texture = <Texture8>;
};
// Pixel constant set by GenGame at runtime
#define NUMBER_PIXEL_SHADER_CONSTANTS 5
float4 PixelConstant[ NUMBER_PIXEL_SHADER_CONSTANTS ] : register( c0 );
//-------------------------------------------------------------------------
/*! This function is used to generate many perturbations of pixel
   shaders. By changing the Boolean flags, we can create unique
   shaders with similar running time.
   \param fVar a some variable to blend with.
   \param fTex is the last texture coordinate, although it could be
      any value.
*/
float4 PurturbPixelConstants( float2 fVar, float2 fTex )
{
  float4 fConst;
  float4 fMod = float4( 0.41, .685, .145, 0.0 );
  if( PSOpt0 ) {
     fMod -= .6;
```

```
}
if( PSOpt1 ) {
   fMod += 1.84;
}
if( PSOpt2 ) {
   fMod /= .474;
}
if( PSOpt3 ) {
   fMod.x += 0.86;
}
if( PSOpt4 ) {
   fMod.y -= .35;
}
if( PSOpt5 ) {
   fMod.z *= 1.15;
}
fMod = normalize( fMod );
fMod.a = 1.0;
// select a const
fConst = PixelConstant[ 0 ];
if( PSOpt6 ) {
   fConst = PixelConstant[ 1 ];
}
if( PSOpt7 ) {
   fConst = PixelConstant[ 2 ];
}
if( PSOpt8 ) {
   fConst = PixelConstant[ 3 ];
}
if( PSOpt9 ) {
   fConst = PixelConstant[ 4 ];
}
fMod = ( fMod + fConst + float4( fVar, fTex ) ) / 3.0;
return fMod;
}
//---------------------------------------------------------------------------
/*! The TexturePixelShader compute the color of a pixel with up to 16 textures
   and blends the color with the light factor passed computed in the vertex
   shader.
*/
float4 TexturePixelShader(
#if (NUMBER_TEXTURE_COORDINATES > 0)
      in float2 InTextureCoordinates[ NUMBER_TEXTURE_REGISTERS ] :
TEXCOORD0,
#endif
      in float4 Lighting : COLOR0
      ) : COLOR
{
   float4 fColor;
#if( NUMBER_TEXTURE_REGISTERS == 0 )
   fColor = 1.0;
#endif
#if ( NUMBER_TEXTURE_REGISTERS > 0 )
   fColor = tex2D( Sampler1, InTextureCoordinates[ 0 ] );
#endif
#if ( NUMBER_TEXTURE_REGISTERS > 1 )
   fColor += tex2D( Sampler2, InTextureCoordinates[ 1 ] );
#endif
#if ( NUMBER_TEXTURE_REGISTERS > 2 )
   fColor += tex2D( Sampler3, InTextureCoordinates[ 2 ] );
#endif
#if ( NUMBER_TEXTURE_REGISTERS > 3 )
   fColor += tex2D( Sampler4, InTextureCoordinates[ 3 ] );
#endif
#if ( NUMBER_TEXTURE_REGISTERS > 4 )
   fColor += tex2D( Sampler5, InTextureCoordinates[ 4 ] );
#endif
#if ( NUMBER_TEXTURE_REGISTERS > 5 )
   fColor += tex2D( Sampler6, InTextureCoordinates[ 5 ] );
#endif
#if ( NUMBER_TEXTURE_REGISTERS > 6 )
   fColor += tex2D( Sampler7, InTextureCoordinates[ 6 ] );
#endif
#if ( NUMBER_TEXTURE_REGISTERS > 7 )
   fColor += tex2D( Sampler8, InTextureCoordinates[ 7 ] );
#endif
#if ( NUMBER_TEXTURE_COORDINATES > 0 )
   fColor /= NUMBER_TEXTURE_COORDINATES;
#else
```

```
    // if we have no textures, just show the lighting computed in the
    // vertex shader.
    fColor = 1.0;
#endif
#if ( NUMBER_TEXTURE_REGISTERS > 0 )
    float4 fPerturb = PurturbPixelConstants( Lighting.xz,
           InTextureCoordinates[ NUMBER_TEXTURE_REGISTERS − 1 ] );
#else
    float4 fPerturb = PurturbPixelConstants( float2( Lighting.xw ),
                      float2( Lighting.yz ) );
#endif
    return ( (Lighting * fColor ) + fPerturb ) / 2.0;
}
//---------------------------------------------------------------------
// END OF : TextureShaders.fx
//+===========================================++================
```

Example 3, below, is the code for an ALU shader that tests the arithmetic logic unit of the video interface 206. The arithmetic logic unit is the portion of the video interface that performs arithmetic calculations and like.

EXAMPLE 3

```
// ================================================================
/*! \file ALUShaders.fx
    Copyright (c) 2003 Microsoft Corporation
*/
//
// Booleans to generate different shaders at runtime.
//
bool VSOpt0 : VSOPT0 = 0;
bool VSOpt1 : VSOPT1 = 0;
bool VSOpt2 : VSOPT2 = 0;
bool VSOpt3 : VSOPT3 = 0;
bool VSOpt4 : VSOPT4 = 0;
bool VSOpt5 : VSOPT5 = 0;
bool VSOpt6 : VSOPT6 = 0;
bool VSOpt7 : VSOPT7 = 0;
bool VSOpt8 : VSOPT8 = 0;
bool VSOpt9 : VSOPT9 = 0;
bool PSOpt0 : PSOPT0 = 0;
bool PSOpt1 : PSOPT1 = 0;
bool PSOpt2 : PSOPT2 = 0;
bool PSOpt3 : PSOPT3 = 0;
bool PSOpt4 : PSOPT4 = 0;
bool PSOpt5 : PSOPT5 = 0;
bool PSOpt6 : PSOPT6 = 0;
bool PSOpt7 : PSOPT7 = 0;
bool PSOpt8 : PSOPT8 = 0;
bool PSOpt9 : PSOPT9 = 0;
// Vertex constants array
#define VERTEX_CONSTANT_ARRAY_SIZE 15
float4 VertexConstantArray[ VERTEX_CONSTANT_ARRAY_SIZE ] : register
(c4);
float4x4 WorldViewProjectionMatrix : register(c0);
// Debug: Setting constant statically, not programmatically. Used to view
// assembly instructions using fxc.exe.
//
// Generally, NUMBER_TEXTURE_COORDINATES is set by GenGame during
runtime
// based on the number of texture coordinates in the sphere currently
// being rendered
// #define NUMBER_TEXTURE_COORDINATES 2
#if (NUMBER_TEXTURE_COORDINATES > 6)
#define NUMBER_TEXTURE_REGISTERS 6
#else
#define NUMBER_TEXTURE_REGISTERS
NUMBER_TEXTURE_COORDINATES
#endif // shaders for alubound ops
//---------------------------------------------------------------------
```

```
/*! This function is used to generate many perturbations of vertex
    shaders. By changing the Boolean flags, we can create unique
    shaders with similar running time.
    \param fPos is the screen position, although it could be any value.
    \param fTex is the last texture coordinate, although it could be
        any value.
*/
float4 PurturbVertexConstants( float4 fPos, float2 fTex )
{
    float4 fBlend = 1.0;
    float4 fMod = float4( 0.95, 0.48, 1.14, 0.0 );
    if( VSOpt0 ) {
        fMod -= .6;
    }
    if( VSOpt1 ) {
        fMod += 1.9;
    }
    if( VSOpt2 ) {
        fMod /= .234;
    }
    if( VSOpt3 ) {
        fMod.x += 0.52;
    }
    if( VSOpt4 ) {
        fMod.y -= .3;
    }
    if( VSOpt5 ) {
        fMod.z *= .458;
    }
    if( VSOpt6 ) {
        fMod *= 1.124;
    }
    fMod.a = 0.0; // do not affect alpha
    float4 vc0, vc1, vc2;
    for(int j=2; j < VERTEX_CONSTANT_ARRAY_SIZE-2; j += 1 ) {
        vc0 = VertexConstantArray[ j ];
        vc1 = VertexConstantArray[ j - 1 ];
        // Note that with compilation, only the last assignment is outputted
        if( VSOpt7 ) {
            vc1 = VertexConstantArray[ j + 1 ];
        }
        if( VSOpt8 ) {
            vc1 = VertexConstantArray[ j + 2 ];
        }
        if( VSOpt9 ) {
            vc1 = VertexConstantArray[ j - 2 ];
        }
        fBlend *= vc0 + vc1;
    }
    fBlend = 1.5 * normalize( fBlend * fMod * fPos * float4( fTex, fTex ) );
    return fBlend;
}
//----------------------------------------------------------------------------
/*! This vertex shader is designed for the ALU test.
    It transforms the vertex into clip space and passes on the
    transformed vertex to the pixel shader.
    \note that the Normal and Position is passed in world space to the
    pixel shader to compute lighting.
*/
void ALUVertexShader(
    #if (NUMBER_TEXTURE_REGISTERS > 0)
        float2 InTextureCoordinates[NUMBER_TEXTURE_REGISTERS] : TEXCOORD0,
        out float2 OutTextureCoordinates[NUMBER_TEXTURE_REGISTERS] : TEXCOORD0,
    #endif
        out float4 OutVSInNormal : TEXCOORD7,
        out float3 OutVSInPosition : TEXCOORD6,
        out float4 OutScreenPosition : TEXCOORD5,
        float4 InPosition : POSITION,
        float4 InNormal : NORMAL,
        out float4 OutPosition : POSITION0,
        out float4 ColorModifier : COLOR0
        )
{
    // compute screen position of vertex
    OutPosition = mul(InPosition, WorldViewProjectionMatrix);
    // send down the normal and position in world space
    OutVSInNormal = InNormal;
```

```
    OutVSInPosition = InPosition;
    OutScreenPosition = float4( OutPosition.xy, OutPosition.yx );
    // if we have texture coordinates, copy them to the output registers
    #if (NUMBER_TEXTURE_COORDINATES > 0)
    for(int i = 0; i < NUMBER_TEXTURE_REGISTERS;i++) {
        OutTextureCoordinates[i] = InTextureCoordinates[i];
    }
    ColorModifier = PurturbVertexConstants(
                    float4( OutPosition.xy, OutPosition.xy ),
                    InTextureCoordinates[ NUMBER_TEXTURE_REGISTERS - 1 ] );
    #else
    ColorModifier = PurturbVertexConstants(
                    float4( OutPosition.xy, OutPosition.yx ),
                    float2(InNormal.y, InNormal.z ) );
    #endif
}
// Texture stages we may use
texture Texture1 : TEXTURE0;
texture Texture2 : TEXTURE1;
texture Texture3 : TEXTURE2;
texture Texture4 : TEXTURE3;
texture Texture5 : TEXTURE4;
// setup samplers for each texture stage
sampler Sampler1 = sampler_state
{
    Texture = <Texture1>;
};
sampler Sampler2 = sampler_state
{
    Texture = <Texture2>;
};
sampler Sampler3 = sampler_state
{
    Texture = <Texture3>;
};
sampler Sampler4 = sampler_state
{
    Texture = <Texture4>;
};
sampler Sampler5 = sampler_state
{
    Texture = <Texture5>;
};
// lights for the scene
#define CAMERA_POSITION 0
#define NUMBER_OF_LIGHTS 3
float4 LightPositions[ NUMBER_OF_LIGHTS ] : register( c5 );
#define SPECULAR_POWER 4
// Pixel constant set by GenGame at runtime
#define NUMBER_PIXEL_SHADER_CONSTANTS 5
float4 PixelConstant[ NUMBER_PIXEL_SHADER_CONSTANTS ] : register( c0 );
//---------------------------------------------------------------------------
/*! This function is used to generate many perturbations of pixel
    shaders. By changing the Boolean flags, we can create unique
    shaders with similar running time.
    \param fVar a some variable to blend with.
*/
float4 PurturbPixelConstants( float4 fVar )
{
    float4 fConst;
    float4 fMod = float4( 0.51, .998, .6584, 0.0 );
    if( PSOpt0 ) {
        fMod -= .6;
    }
    if( PSOpt1 ) {
        fMod += 1.84;
    }
    if( PSOpt2 ) {
        fMod /= .474;
    }
    if( PSOpt3 ) {
        fMod.x += 0.86;
    }
    if( PSOpt4 ) {
        fMod.y -= .35;
    }
    if( PSOpt5 ) {
        fMod.z *= 1.15;
    }
```

-continued

```
    // select a const
    fConst = PixelConstant[ 0 ];
    if( PSOpt6 ) {
        fConst = PixelConstant[ 1 ];
    }
    if( PSOpt7 ) {
        fConst = PixelConstant[ 2 ];
    }
    if( PSOpt8 ) {
        fConst = PixelConstant[ 3 ];
    }
    if( PSOpt9 ) {
        fConst = PixelConstant[ 4 ];
    }
    fMod = fMod * fConst * fVar;
    fMod.xyz = normalize( fMod.xyz );
    fMod.a = 1.0;
    return fMod;
}
//-----------------------------------------------------------------------------
/*! The ALUPixelShader compute the color of a pixel with up to 5 textures and
    lights it.
*/
float4 ALUPixelShader(
        #if (NUMBER_TEXTURE_REGISTERS > 0)
            in float2 InTextureCoordinates[ NUMBER_TEXTURE_REGISTERS ] : TEXCOORD0,
        #endif
        in float4 InScreenPos : TEXCOORD5,
        in float4 InNormal : TEXCOORD7,
        in float3 InPosition : TEXCOORD6
        ) : COLOR
{
    float4 fSum = 1.0;
#if (NUMBER_TEXTURE_REGISTERS > 0)
    // loop over all textures and set the texture vector
    #if ( NUMBER_TEXTURE_COORDINATES > 0 )
    fSum = tex2D( Sampler1, InTextureCoordinates[ 0 ] );
    #endif
    #if ( NUMBER_TEXTURE_COORDINATES > 1 )
    fSum += tex2D( Sampler2, InTextureCoordinates[ 1 ] );
    #endif
    #if ( NUMBER_TEXTURE_COORDINATES > 2 )
    fSum += tex2D( Sampler3, InTextureCoordinates[ 2 ] );
    #endif
    #if ( NUMBER_TEXTURE_COORDINATES > 3 )
    fSum += tex2D( Sampler4, InTextureCoordinates[ 3 ] );
    #endif
    #if ( NUMBER_TEXTURE_COORDINATES > 4 )
    fSum += tex2D( Sampler5, InTextureCoordinates[ 4 ] );
    #endif
    fSum /= NUMBER_TEXTURE_COORDINATES;
#endif
    float4 Lighting = .1; // start off with the ambient term
    float4 vPointToCamera = float4( normalize( LightPositions[ CAMERA_POSITION] - InPosition ), 1.0 );
    for(int iLight = 0; iLight < NUMBER_OF_LIGHTS; ++iLight) {
        float3 vPointToLight = normalize( LightPositions[iLight] - InPosition );
        float3 vReflection = reflect( normalize( InPosition - LightPositions[ iLight ].xyz ),
                InNormal );
        float fPhongValue = saturate( dot( vReflection, vPointToCamera ) );
        // Calculate specular term
        float fSpecular = pow( fPongValue, SPECULAR_POWER );
        // compute diffuse term
        float fDiffuse = max( dot( InNormal, vPointToLight ), 0 );
        float fDistance = distance( LightPositions[iLight], InPosition );
        Lighting += ( fSpecular + fDiffuse ) / fDistance;
    }
    float4 fPerturb = PurturbPixelConstants( abs( InScreenPos ) );
    return Lighting * lerp( fSum, fPerturb, .35 );
}
//-----------------------------------------------------------------------------
// END OF : ALUShaders.fx
//+===========================================
```

It will be understood that the CSM 212 can use any suitable method to randomize the resulting compiled code of one or more shader programs. For example, in an alternate embodiment, in lieu of, or in combination with, randomizing parameters, the CSM 212 can randomize the way that fragments of a shader program are assembled and linked together. Such an alternative embodiment, although not limited to, may be used where a low level shader programming language is used.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof. Additionally, although the method is described with reference evaluating the performance of a video interface, it can be used to quantify the performance of any type of interface.

I claim:

1. A method for assessing relative performance of a video interface, comprising:
    executing a first module, the first module operative to load a sub-module;
    loading one or more sub-modules into the first module, each sub-module including code for assessing performance of the video interface, the code having a plurality of Boolean compiler parameters, and instructions associated with each Boolean compiler parameter;
    setting a value of one or more of the plurality of Boolean compiler parameters to a random value prior to compiling the code, the value of the one or more of the plurality of Boolean compiler parameters being set by the first module;
    determining whether to include or exclude instructions within the one or more sub-modules for compilation based on the random value of the Boolean compiler parameter associated with the instructions;
    compiling the code using the first module;
    communicating the compiled code to the video interface;
    executing the code by the video interface;
    collecting statistics concerning the performance of the video interface during execution of the code, the statistics collected by the first module.

2. The method of claim 1, wherein one of the one or more sub-modules comprises a basic shader to test efficiency of memory access of the video interface.

3. The method of claim 1, wherein one of the one or more sub-modules comprises a texture shader to test efficiency of the video interface to render and display images.

4. The method of claim 1, wherein one of the one or more sub-modules comprises an arithmetic logic unit shader to test efficiency of the video interface to perform arithmetic operations.

5. The method of claim 1 wherein the compiled code has substantially a same length and complexity regardless of the random value assigned to the parameters.

6. The method of claim 1 wherein the statistics include a number of frames per second rendered and displayed by the video interface.

7. The method of claim 1, wherein one of the one or more sub-modules is a shader program that comprises a pixel shader component and a vertex shader component.

8. A computer-readable storage medium having instructions for assessing relative performance of a video interface, comprising:
    executing a first module, the first module operative to load a sub-module;
    loading one or more sub-modules, each sub-module including code for assessing performance of the video interface, the code having a plurality of Boolean compiler parameters, and instructions associated with each Boolean compiler parameter;
    setting a value of one or more of the plurality of Boolean compiler parameters to a random value prior to compiling the code, the value of the one or more of the plurality of Boolean compiler parameters being set by the first module;
    determining whether to include or exclude instructions within the one or more sub-modules for compilation based on the random value of the Boolean compiler parameter associated with the instructions;
    compiling the code using the first module;
    communicating the compiled coded to the video interface;
    executing the code by the video interface;
    collecting statistics concerning the performance to the video interface during execution of the code.

9. The computer-readable storage medium of claim 8, wherein one of the one or more sub-modules comprises a basic shader to test efficiency of memory access of the video interface.

10. The computer-readable storage medium of claim 8, wherein one of the one or more sub-modules comprises a texture shader to test efficiency of the video interface to render and display images.

11. The computer-readable storage medium of claim 8, wherein one of the one or more sub-modules comprises an arithmetic logic unit shader to test efficiency of the video interface to perform arithmetic operations.

12. The computer-readable storage medium of claim 8, wherein the compiled code has substantially a same length and complexity regardless of the random value assigned to the parameters.

13. The computer-readable storage medium of claim 8 wherein the statistics include a number of frames per second rendered and displayed by the video interface.

14. The computer-readable storage medium of claim 8, wherein one of the more sub-modules is a shader program that comprises a pixel shader component and a vertex shader component.

15. A system for assessing relative video performance; comprising:
    a computer having a video interface; and
    a combinatorial shader module for executing a method, the method comprising:
        loading one or more sub-modules into the combinatorial shader module, each sub-module including code for assessing performance of the video interface, the code having a plurality of Boolean compiler parameters, and instructions associated with each Boolean compiler parameter;
        setting a value of one or more of the plurality of Boolean compiler parameters to a random value prior to compiling the code, the value of the one or more of the plurality of Boolean compiler parameters being set by the combinatorial shader module;

determining whether to include or exclude instructions within the one or more sub-modules for compilation based on the random value of the Boolean compiler parameter associated with the instructions;

compiling the code using the combinatorial shader module;

communicating the compiled code to the video interface;

executing the code by the video interface; and collecting statistics concerning the performance of the video interface during execution of the code, the statistics collected by the combinatorial shader module.

16. The system of claim 15, wherein one of the one or more sub-modules comprises a basic shader to test efficiency of memory access of the video interface.

17. The system of claim 15, wherein one of the one or more sub-modules comprises a texture shader to test video efficiency of the video interface to render and display images.

18. The system of claim 15, wherein one of the one or more sub-modules comprises an arithmetic logic unit shader to test efficiency of the video interface to perform arithmetic operations.

19. The system of claim 15, wherein the compiled code has substantially a same length and complexity regardless of the random value assigned to the parameters.

20. The system of claim 15, wherein one of the one or more sub-modules is a shader program that comprises a pixel shader component and a vertex shader component.

* * * * *